Nov. 10, 1964 D. P. GRUDOSKI Re. 25,677
PLAY SWING
Original Filed Aug. 8, 1961
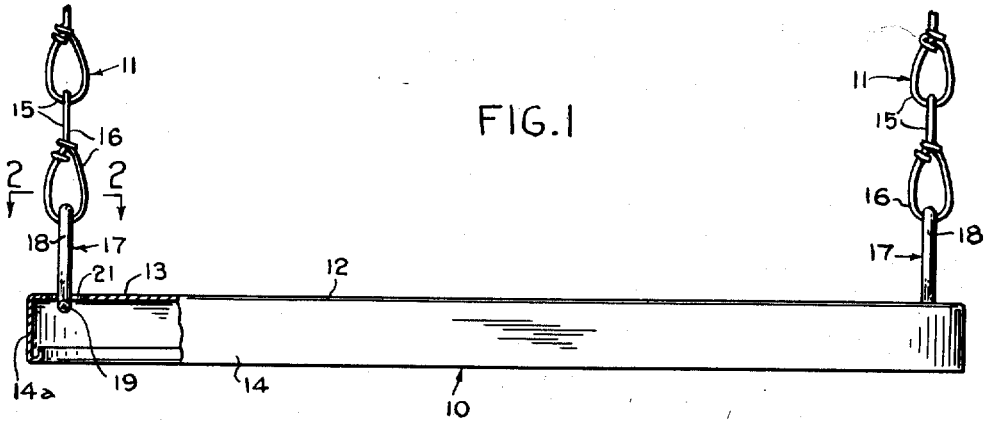
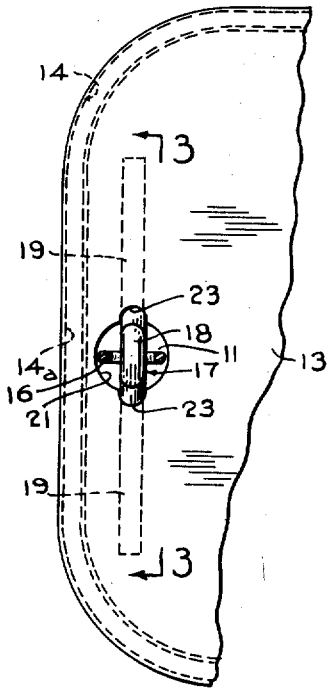
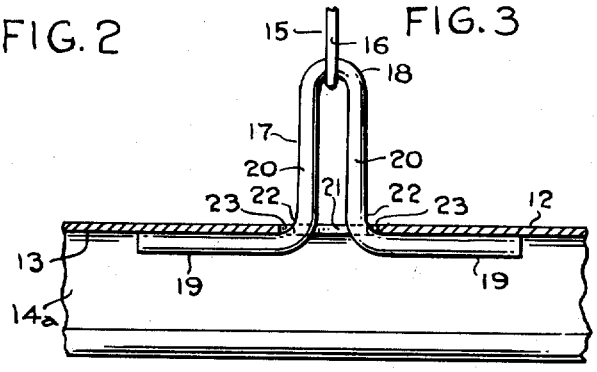
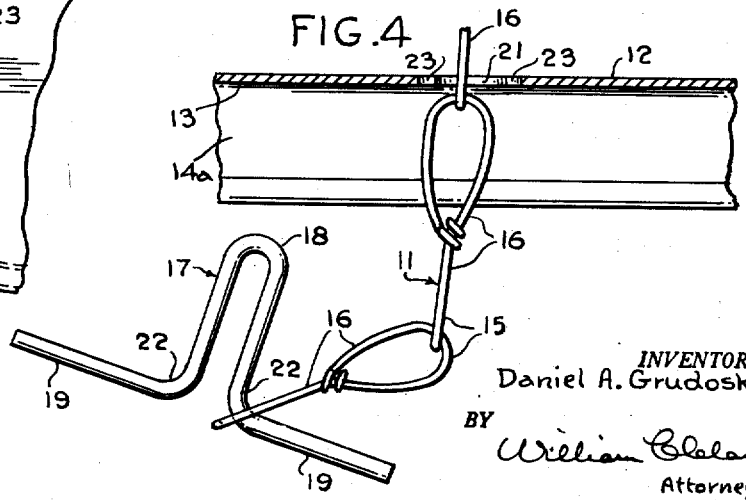
INVENTOR.
Daniel A. Grudoski
BY
William Cleland
Attorney United States Patent Office Re. 25,677
Reissued Nov. 10, 1964

25,677
PLAY SWING

Daniel P. Grudoski, Hartstown, Pa., assignor to Blazon, Inc., Cuyahoga Falls, Ohio, a corporation of Ohio Original No. 3,088,734, dated May 7, 1963, Ser. No. 130,135, Aug. 8, 1961. Application for reissue Aug. 6, 1963, Ser. No. 300,400
2 Claims. (Cl. 272—85)

Matter enclosed in heavy brackets [ ] appears in the original patent but forms no part of this reissue specification; matter printed in italics indicates the additions made by reissue.

This invention relates to a play swing of the type including a seat supported on the lower end of a pair of flexible suspension elements, such as link chains.

One object of the invention is to provide a swing of the character described having improved means for rapidly attaching the seat for support on the suspension elements without use of separate attaching means, such as pins, rivets, bolts or other screw means, which are likely to become loose.

Another object of the invetion is to provide a swing of the character described in which the seat is attachable to safe condition of use on the suspension elements without requiring tools of any kind.

Still another object of the invention is to provide a swing of the character described including improved seat attaching means which obviates objectionable turning or twisting of the suspension elements with respect to the seat.

Other objects of the invention will be manifest from the following brief description and the accompanying drawings.

Of the accompanying drawings:

FIGURE 1 is a front elevation, partly broken away and in section, of a play swing embodying the features of the invention.

FIGURE 2 is an enlarged fragmentary cross-section, taken substantially on the line 2—2 of FIGURE 1.

FIGURE 3 is a fragmentary cross-section, on the same scale, taken substantially on the line 3—3 of FIGURE 2.

FIGURE 4 is a view corresponding to FIGURE 3, but illustrating the manner of attaching or detaching the seat with respect to the suspension elements.

Referring to the drawings generally, the numeral 10 designates a play swing made in accordance with the invention, including a pair of flexible suspension elements 11, 11, such as link chains, which are suspended in known manner from an overhead beam or other structure (not shown), and a rectangular seat 12 releasably supported on the lower ends of the suspension elements. The seat may be formed of sheet metal to have a thin web portion 13 and a down-turned peripheral flange 14. The links 15 of the chain elements 11, as shown, are of twisted wire and have opposite end eyelets 16, 16 disposed in planes at right angles to each other.

For releasably attaching the seat 12 to the elements 11, a pair of hangers 17, 17 are each formed from a single length of rigid wire stock, *of uniform diameter*, to have a reversely formed central loop portion 18, and oppositely out-turned end extensions 19, 19 of substantial length, and in a general plane of the hanger. The central loop 18 may have straight side portions 20, 20 which are in substantially closely spaced parallelism, and the free extensions 19 may be substantially at right angles to said straight side portions of the loop. The junctures between the side portions 20 and extensions 19 therefrom may be formed with a radius, as indicated by the numeral 22, and the space between the side portions 20 opens outwardly between said junctures for purposes to be described. Each hanger 17, with the loop 18 thereof in linked connection through an eyelet 16 at the lower end of the respective suspension element 11, is received *freely* upwardly, *endwise* through a circular aperture 21 in an end margin of the web 13 closely adjacent a straight end flange portion 14a of the seat, and the seat is supported on the suspension elements by downward gravitational engagement of the web portion 13 with said extensions 19 of the two hangers, as best shown in FIGURES 2 and 3. The apertures 21 are made slightly larger than the widest portions of loops 18, *and are otherwise of such size and shape* to allow for free *endwise sliding* passage of the loops through the same, as well as free *lengthwise* passage of the *connected* link chains 11 *in either direction*, for purposes to be described later. For preventing the suspension elements from becoming twisted with respect to the seat 12, notched portions 23, 23 are provided in transversely opposite edges of each aperture 21 to be self-centeringly engaged by the curved junctures 22 of the respective hanger 17. If, for any reason, the hanger is forced out of such engagement with the notches 23, substantial turning movement of the hanger is in any event prevented by engagement of the hanger extensions 19 with the closely adjacent end flange portions 14a of the seat (see FIGURE 2).

The method of quick attachment of seat 12 to the suspension elements 11 without use of separate locking or fastening means, and without use of tools of any kind, is best understood by reference to FIGURE 4. While holding the seat 12 in one hand, the other hand is used to feed several links of the lower end of suspension chain 11 through one of the seat apertures 21. After releasing the chain in the relative condition shown in FIGURE 4, the freed hand is used to thread an end portion 19 of a hanger 17 endwise through an eyelet 16 of one of the lower end chain links 15, if not the lowermost one. From the FIGURE 4 positions of the device the hanger is next moved with respect to the chain toward linked supporting engagement of the respective eyelet 16 with the outer end of loop portion 18, as permitted by the spacing of the side portions 20 of the loop 18, and then the chain 11 and loop portion 18 of the hanger are *slidably* drawn up through the aperture 21 until the seat is gravitationally supported on hanger extensions 19, as shown in FIGURE 3. This procedure is repeated to support the seat on the other suspension chain 11, after which the swing is ready for use. The same procedure may be followed in converse order to remove the seat from suspension chains 11, as for storage or other purposes. In any event, the arrangement is such that deliberate effort, as described above, is required to remove the seat from the suspension chains 11. That is, the seat cannot be accidentally removed from the suspension chains in normal use of the swing.

Modifications of the invention may be resorted to without departing from the spirit of the invention or the scope of the appended claims.

What is claimed is:

[1. A play swing for suspension from an overhead support, comprising: a seat having laterally spaced apertures through laterally opposite marginal portions thereof; a pair of elongated suspension elements adapted to be swingably suspended in laterally spaced relation from the overhead support, and having eyelets at least at lower ends thereof; and a pair of hangers; each said hanger being of rigid material providing a central loop defined by spaced side portions inturned from a connecting outer end of the loop, and further providing oppositely out-turned terminal end portions, there being a space between said side portions opening outwardly at junctures thereof with said terminal end portions, but the width of the loop otherwise permitting free endwise projection thereof upwardly through a said seat aperture until said terminal end portions supportingly engage the underside of the corresponding said marginal portion, and said loop and terminal end portions being of generally uniform cross-section permitting reception of a said terminal end portion endwise through a selected said eyelet of the respective said element and reception of an edge portion of the eyelet within said space to provide linked supporting engagement of the eyelet with said outer end of the loop; whereby said elements are separately downwardly adjustable through the respective said seat apertures for said linked selective supporting engagement of the hangers with eyelets of the respective suspended elements, and for supporting the seat on the terminal end portions of the hangers.]

[2. A swing as set forth in claim 1, each said aperture having transversely opposite edge portions of laterally reduced width, and the junctures of said spaced side portions of the corresponding hanger and said terminal end portions thereof being formed for interlocking reception is said opposite reduced edge portions in the seat-supporting position of the hanger and thereby to restrict turning movement of the hanger with respect to the seat.]

[3. A swing as set forth in claim 2, wherein said marginal portions of the seat have downturned extensions adjacent the respective said apertures to be engageable by said terminal end portions of the corresponding said hangers in seat-supporting positions thereof, and thereby to limit turning movement of the hangers in said apertures in either direction with respect to the seat.]

[4. A swing as set forth in claim 1, where said marginal portions of the seat have downturned extensions adjacent the respective said apertures to be engageable by terminal end portions of the corresponding said hangers in seat-supporting positions thereof, and thereby to limit turning movement of the hangers in said apertures in either direction with respect to the seat.]

*5. A play swing for suspension from an overhead support, comprising: a seat having laterally spaced apertures through laterally opposite marginal portions thereof; a pair of elongated suspension elements adapted to be swingably suspended in laterally spaced relation from the overhead support, and including connected chain links at lower ends thereof, each said seat aperture being of size and shape adapted to limit the connected chain links of the respective suspension element to be freely slidable lengthwise therethrough in either direction; and a pair of hangers; each said hanger being a single length of rigid wire material of uniform cross-section, formed to provide a central loop defined by spaced side portions inturned from a connecting outer end of the loop, and further providing oppositely out-turned terminal end portions, there being a space between said side portions opening outwardly at junctures thereof with said terminal end portions, but the width of the loop otherwise permitting free endwise projection thereof upwardly through a said seat aperture until said terminal end portions supportingly engage the underside of the corresponding said marginal portion of the seat and a substantial extent of the loop is freely presented above the seat; the uniform cross-section of said hanger permitting free passage of an end portion endwise through a selected chain link of the respective suspension element and the spacing between its side portions permitting reception of a lower portion of the selected link to provide supporting engagement of the selected link with said outer end of the loop whereby the connected chain links of the suspension elements are separately freely slidable through their respective seat apertures toward supporting engagement of the hangers within selected links of their respective suspension elements, and supporting engagement of the seat on the terminal end portions of the hangers; said marginal portions of the seat having downturned extensions adjacent the respective said apertures to be engageable by said terminal end portions of the corresponding said hangers in seat-supporting positions thereof, and thereby adapted to limit turning movement of the hangers in said apertures in either direction with respect to the seat.*

*6. A swing as set forth in claim 5, each said seat aperture having transversely opposite edge portions of laterally reduced width, and the junctures of said spaced side portions of the corresponding hanger and said terminal end portions thereof being rounded for wedged interlocking reception in said opposite reduced edge portions in the seat-supporting position of the hanger and thereby to lock the hanger against turning movement with respect to the seat.*

References Cited by the Examiner

The following references, cited by the Examiner, are of record in the patented file of this patent or the original patent.

UNITED STATES PATENTS

| | | | |
|---|---|---|---|
| 455,032 | 6/91 | Breul. | |
| 2,146,045 | 2/39 | Zippler | 272—89 |
| 2,513,021 | 6/50 | Harrold | 272—90 |
| 2,556,105 | 6/51 | Rhett | 108—106 |

RICHARD C. PINKHAM, *Primary Examiner.*